UNITED STATES PATENT OFFICE.

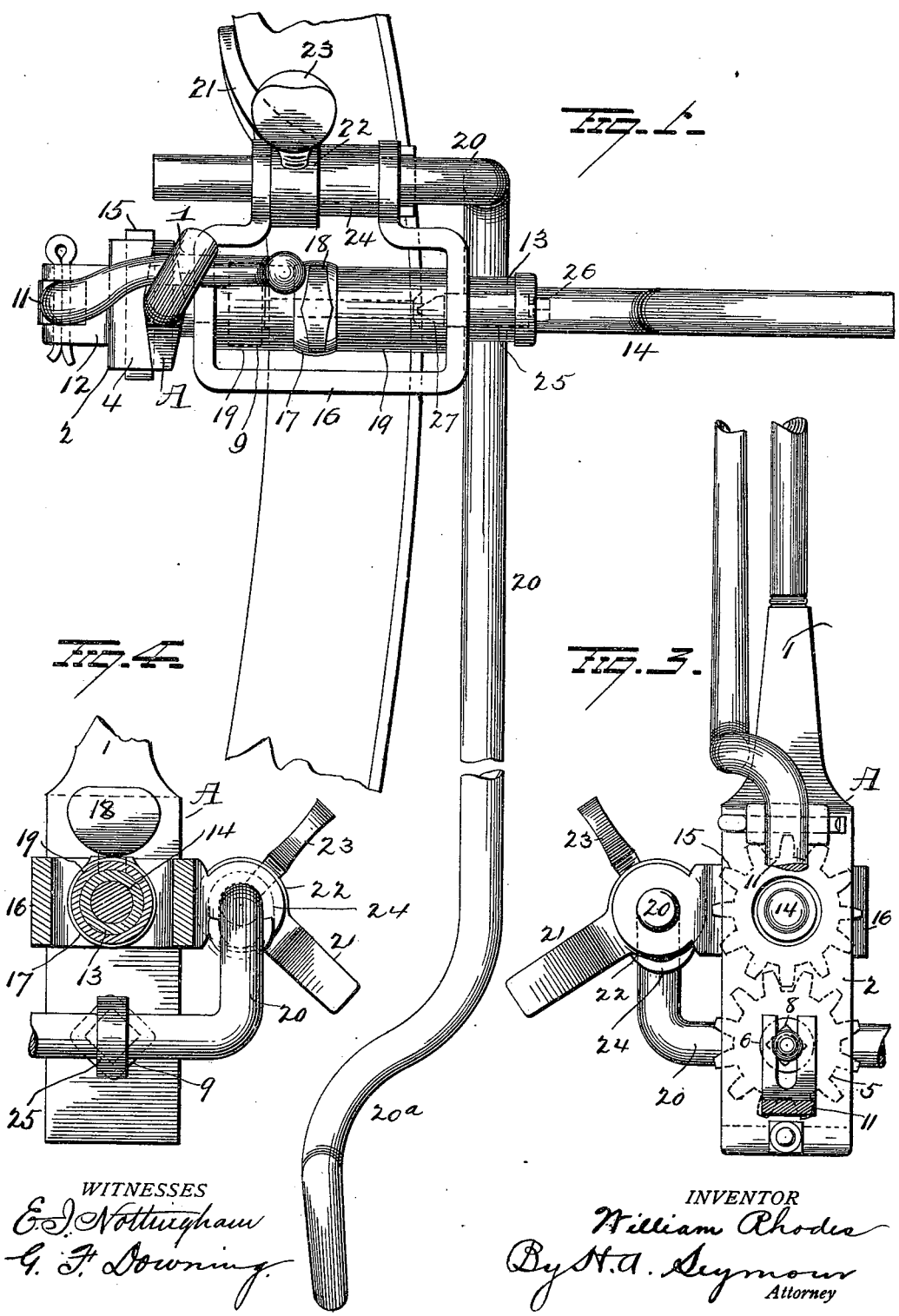

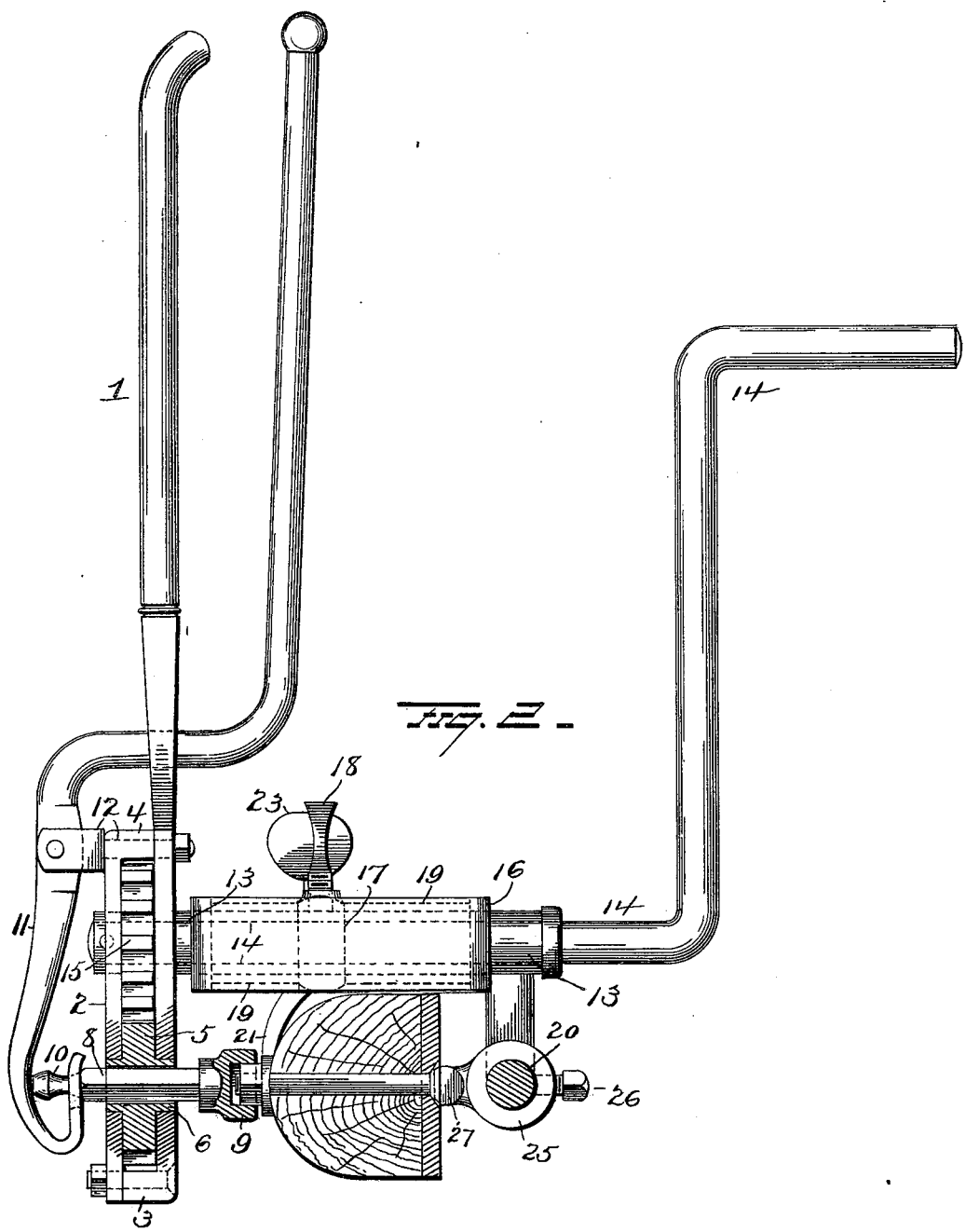

WILLIAM RHODES, OF DARWIN, ILLINOIS.

WHEELWRIGHT-MACHINE.

SPECIFICATION forming part of Letters Patent No. 675,299, dated May 28, 1901.

Application filed August 1, 1900. Serial No. 25,560. (No model.)

*To all whom it may concern:*

Be it known that I, WILLIAM RHODES, a resident of Darwin, in the county of Clark and State of Illinois, have invented certain new and useful Improvements in Wheelwright-Machines; and I do hereby declare the following to be a full, clear, and exact description of the invention, such as will enable others skilled in the art to which it appertains to make and use the same.

My invention relates to an improvement in wheelwright-machines, and more particularly to an apparatus for applying and removing nuts, the object of the invention being to provide an apparatus of the above-mentioned character which can be effectually held on the rim of a wheel and which will by the expenditure of but a small amount of power remove nuts from and replace them on the bolts securing the rim on a wheel.

With this object in view the invention consists in certain novel features of construction and combinations and arrangements of parts, as will be more fully hereinafter described, and pointed out in the claims.

In the accompanying drawings, Figure 1 is a view showing my improvements in operative position. Fig. 2 is a view in vertical section, and Figs. 3 and 4 are views in section taken at right angles thereto.

A represents a bar provided with an elongated handhold 1 on its upper end, and a plate 2 is secured to the lower portion of the bar A and spaced therefrom by flanges 3 and 4, respectively, on the plate and bar, thus forming an open frame. A gear-wheel 5, having trunnions 6 thereon, is mounted in the frame and is made with an angular bore, in which is movably mounted an angular spindle 8, provided on one end with an enlargement 9, having an angular socket therein to receive a nut and on its other end rounded and made with a head 10 to receive the bent-up bifurcated end of an operating-lever 11. The lever 11 is fulcrumed between its ends in the bifurcated head of a bolt 12, assisting in holding the plate 2 and bar A together, and the upper portion of the lever 11 is bent at right angles and extends beyond handhold 1 and is again bent and extends up approximately parallel therewith. A sleeve 13 is secured to the bar A and has mounted therein a crank-shaft 14, carrying a gear-wheel 15, mounted in the frame and in mesh with gear-wheel 5. A yoke 16 is supported on sleeve 13 and held in proper position thereon by collar 17, having thumb-screw 18 thereon and spacing-rings 19 on each side thereof. The free ends of the yoke are made with alined holes to receive one end of a rod 20, and a tongue 21, having a bearing-collar 22 thereon, is secured on the rod by thumb-screw 23, and a spacing-ring 24 is provided on the rod between the jaws or ends of the yoke to prevent transverse movement of the collar 22, and consequently the rod 20 on which it is secured. The rod 20 is bent downward at right angles and again bent at right angles and extends forward, where it is bent to form a rest 20ª, to be pressed forward by the body of the operator for a purpose which will more fully hereinafter appear. A collar 25 is secured against movement on the rod 20 by a set-screw 26 and is provided with a beveled or sharpened tooth 27, to be held in the groove in the head of a bolt or screw and prevent rotary movement of the same while the nut thereon is being operated.

The operation of my improvements is as follows: When a nut is to be unscrewed, the socketed enlargement 9 is placed on the nut, the tongue 21 disposed against the inner edge of the wheel-felly, and the tooth 27 on collar 25 in the grooved head of the bolt or screw, the leg of the operator being pressed against the bent end of rod 20 to hold the device firmly in place, while the operator firmly holds with his left hand the bar A and lever 11, the latter holding the socketed enlargement 9 on the nut. The crank-shaft 14 is now turned and motion transmitted by gears 15 and 5 to the spindle 8 and the nut quickly removed. When a nut is to be screwed on the bolt, the nut is inserted in the socketed enlargement 9 and the device placed in position, as before, when by turning the crank-shaft 14 in the reverse direction the nut can be readily screwed home.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a portable wheelwright-machine, the combination with a bar and a frame thereon, of gear-wheels mounted in said frame, a longitudinally-movable spindle carried by one gear-wheel and adapted to receive a nut and operating means mounted in said frame and secured to the other gear-wheel.

2. In a portable wheelwright-machine, the combination with a bar and a frame thereon, of two gear-wheels in said frame, an operating-shaft mounted in said frame and secured to one of said gear-wheels, a spindle longitudinally movable through the other gear-wheel and adapted at one end to receive a nut and a lever pivoted to said frame and connected with said spindle for moving it longitudinally.

3. In a wheelwright-machine, the combination with a bar having a portion forming a handle and a lever pivotally connected with said bar and also having a portion constituting a handle, of a longitudinally-movable spindle carried by said bar and having a loose connection at one end with said lever and provided at its other end with a head to receive a nut and means carried by said bar for rotating said spindle.

4. In a wheelwright-machine, the combination with a bar and a sleeve projecting laterally therefrom, of an operating-shaft mounted in the sleeve, a gear-wheel on said shaft, another gear-wheel carried by the bar, a spindle longitudinally movable through the last-mentioned gear-wheel and provided at one end with a head for the reception of a nut, and means for moving said spindle longitudinally.

5. The combination of a crank-shaft, a portable bar supporting the same, a gear-wheel on said shaft, another gear carried by the bar and meshing with the first-mentioned gear and an angular spindle movably mounted in said last-mentioned gear and adapted to be turned thereby, means on the spindle for holding a nut and means carried by the portable bar for moving said spindle longitudinally.

6. The combination with a portable bar supporting intermeshing gears, of a spindle adapted to be revolved by one of said gears, a socketed enlargement on one end of the spindle to receive a nut, a crank-shaft secured to one of said gears and carried by the portable bar for turning the spindle, and a lever fulcrumed between its ends to said portable bar and having a loose connection at its other end to the spindle so as to move the same longitudinally.

7. The combination of a bar having a handhold thereon, a spindle mounted to rotate in said bar and adapted to receive a nut, means carried by said bar for moving the spindle longitudinally, means carried by the bar for turning the spindle and means supported by said bar for holding the bolt against turning while the nut thereon is being operated.

8. The combination of a bar, intermeshing gears supported thereby, a spindle adapted to receive a nut and locked to one of said gears, means for moving the spindle longitudinally, a sleeve secured to the bar and carrying a crank-shaft adapted to operate the gears, a yoke on the sleeve, a rod connected to the yoke, a tongue on the rod adapted to be held against the rim or felly of a wheel by the pressure of the operator's body on the rod and a tooth on the rod adapted to hold a bolt or screw against turning while the spindle is operating the nut.

9. The combination in a portable wheelwright-machine, of a bar, a longitudinally-movable spindle carried by said bar and provided with a head for the reception of a nut, means carried by the bar for rotating said spindle, means for moving the spindle longitudinally, a lateral extension on said bar, a yoke loosely mounted on said lateral extension, an arm connected with said yoke and means carried by said arm for holding a bolt from turning.

10. The combination in a portable wheelwright-machine, of a bar, a spindle carried by the bar and adapted at one end for the reception of a nut, means carried by the bar for rotating said spindle, means for moving the spindle longitudinally, a lateral extension on the bar, a yoke mounted loosely on said lateral extension, a tongue carried by said yoke to engage a wheel, and an arm connected with said yoke to be engaged by the operator.

In testimony whereof I have signed this specification in the presence of two subscribing witnesses.

WILLIAM RHODES.

Witnesses:
HETTIE FILES,
WM. S. COONS.